United States Patent [19]
Cooper et al.

[11] Patent Number: 6,025,874
[45] Date of Patent: Feb. 15, 2000

[54] VIDEO MULTIPLEXER

[75] Inventors: Alan Neal Cooper; David William Bauerle, both of Coppell, Tex.

[73] Assignee: Ultrak, Inc., Lewisville, Tex.

[21] Appl. No.: 08/868,823

[22] Filed: Jun. 4, 1997

Related U.S. Application Data

[63] Continuation of application No. 08/501,261, Jul. 11, 1995.

[51] Int. Cl.$^7$ .................................................. H04N 7/18
[52] U.S. Cl. ......................... 348/159; 348/153; 348/212; 348/512
[58] Field of Search .................................. 348/159, 153, 348/211–213, 521, 500, 512, 516, 214; H04N 9/00, 7/18, 5/30, 5/225

[56] References Cited

U.S. PATENT DOCUMENTS

| | | | |
|---|---|---|---|
| 3,580,998 | 5/1971 | Hammond et al. | 178/6.8 |
| 3,811,008 | 5/1974 | Lee | 178/6.6 |
| 3,900,705 | 8/1975 | Richter | 178/6.8 |
| 4,037,250 | 7/1977 | McGahan et al. | 358/108 |
| 4,051,524 | 9/1977 | Baxter | 358/108 |
| 4,091,422 | 5/1978 | Amster | 358/210 |
| 4,218,709 | 8/1980 | Baxter et al. | 358/181 |
| 4,298,889 | 11/1981 | Burianek et al. | 358/148 |
| 4,337,481 | 6/1982 | Mick et al. | 358/105 |
| 4,511,886 | 4/1985 | Rodriquez | 348/154 |
| 4,517,593 | 5/1985 | Keller et al. | 358/107 |
| 4,577,344 | 3/1986 | Warren et al. | 382/1 |
| 4,603,352 | 7/1986 | Kaneta et al. | 358/148 |
| 4,700,230 | 10/1987 | Pshtissky | 358/181 |
| 4,814,869 | 3/1989 | Oliver, Jr. | 358/108 |
| 4,920,371 | 4/1990 | Kaneko | 354/410 |
| 4,943,854 | 7/1990 | Shiota et al. | 358/108 |
| 4,943,864 | 7/1990 | Elberbaum | 358/108 |
| 4,945,417 | 7/1990 | Elberbaum | 358/210 |
| 4,949,181 | 8/1990 | Elberbaum | 358/210 |
| 4,954,886 | 9/1990 | Elberbaum | 358/86 |
| 4,977,449 | 12/1990 | Morgan | 358/86 |
| 4,989,085 | 1/1991 | Elberbaum | 358/108 |
| 5,001,473 | 3/1991 | Ritter et al. | 340/825.52 |
| 5,226,066 | 7/1993 | Barr | 378/99 |
| 5,237,408 | 8/1993 | Blum et al. | 358/108 |
| 5,239,376 | 8/1993 | Dittmann et al. | 358/101 |

(List continued on next page.)

FOREIGN PATENT DOCUMENTS

| | | |
|---|---|---|
| 2704379-A1 | 4/1993 | France . |
| 357079781A | 5/1982 | Japan . |
| 2109198 | 4/1990 | Japan . |
| 4192780 | 7/1992 | Japan . |
| 4287488 | 10/1992 | Japan . |
| 6-197344 | 7/1994 | Japan . |
| PCT/US96/11477 | 10/1996 | WIPO . |

OTHER PUBLICATIONS

Elbex, Ltd., Catalog, Serial Video Series, Oct. 1995.
Elbex, Ltd., Catalog, Framelock Series, Oct. 1993.
Elbex, Ltd., What Is I–D–Code?, Nov. 1995.

*Primary Examiner*—Michael H. Lee
*Attorney, Agent, or Firm*—Jenkens & Gilchrist, P.C.

[57] ABSTRACT

A video system controller inserts synchronization pulses on a video camera line, which create a frame of video on the video camera line. The video system controller also inserts camera code in the active video period of a non-viewed line of the frame of video. A plurality of camera units are connected to the video camera line and use the synchronization pulses placed on the video camera line to remain synchronized with the other camera units. Upon sensing a particular camera code on the video camera line, the camera unit which corresponds with the particular camera code will insert a video image signal into the active video time period of the viewed video line for the frame of video having the particular camera code therein. The video camera code returns to the video system controller which receives the frame of video having a composite of the synchronization pulses from video system controller and the video image signal therein. The video system controller then transmits a video image signal to a video recorder or display.

60 Claims, 8 Drawing Sheets

U.S. PATENT DOCUMENTS

| | | | |
|---|---|---|---|
| 5,243,425 | 9/1993 | Thompson | 358/148 |
| 5,249,051 | 9/1993 | Elberbaum et al. | 358/148 |
| 5,262,869 | 11/1993 | Hong | 348/211 |
| 5,264,929 | 11/1993 | Yamaguchi | 358/108 |
| 5,267,039 | 11/1993 | Elberbaum | 358/146 |
| 5,274,450 | 12/1993 | Elberbaum | 358/149 |
| 5,283,649 | 2/1994 | Elberbaum et al. | 348/500 |
| 5,293,231 | 3/1994 | Elberbaum et al. | 348/521 |
| 5,335,014 | 8/1994 | Elberbaum | 348/159 |
| 5,361,096 | 11/1994 | Ohki et al. | 348/387 |
| 5,371,535 | 12/1994 | Takizawa | 348/15 |
| 5,389,968 | 2/1995 | Koyanagi et al. | 348/222 |
| 5,438,362 | 8/1995 | Tabuchi | 348/211 |
| 5,479,206 | 12/1995 | Ueno et al. | 348/211 |
| 5,508,737 | 4/1996 | Lang | 348/159 |
| 5,550,584 | 8/1996 | Yamada | 348/153 |
| 5,579,060 | 11/1996 | Elberbaum | 348/705 |
| 5,583,796 | 12/1996 | Reese | 364/550 |
| 5,586,796 | 12/1996 | Johnson et al. | 364/550 |
| 5,621,729 | 4/1997 | Reese | 370/62 |
| 5,675,738 | 10/1997 | Suzuki et al. | 395/200.09 |
| 5,696,553 | 12/1997 | D'Alfonso et al. | 348/211 |

VIDEO MULTIPLEXER

This is a continuation of application Ser. No. 08/501,261, filed Jul. 11, 1995.

BACKGROUND

The present invention relates to video camera systems, and more particularly, to multiplexing video camera systems.

Multiple video camera systems using a multiplexer have individual coaxial cables which connect each of the individual video cameras with the multiplexer. This method of connecting video cameras requires a significant amount of cable, and labor to run the cables. Therefore, there is a need for multiple video camera systems which can operate on fewer cables.

Also, multiple video camera systems using a multiplexer must either have an expensive time-correcting multiplexer or, the cameras must be synchronized. Currently, if the cameras are to be synchronized, an individual synchronization wire must connect the individual video camera with a system controller. Therefore, there is a need for multiple video camera systems which can synchronize the video cameras without the need of an expensive time-correcting multiplexer or multiple individual synchronization wires to each camera.

SUMMARY

In one embodiment, the system includes a video camera line, a video system controller connected to the video camera line which inserts a synchronization pulse and a camera code on the video camera line, and at least one camera unit connected to the video camera line which inserts a video image signal on the video camera line in response to the camera code on the video camera line which corresponds to the particular camera unit.

In a further embodiment, the video system controller includes a timing control generating a timing signal which contains instructions to insert the synchronization pulse and the camera code on the video camera line, a synchronization pulse and camera code inserter generating a synchronization pulse and a camera code in response to receiving the timing signal from the timing controller, and a current driver inserting on the video camera line a current mode of the synchronization pulse and the camera code upon receiving the synchronization pulse and the camera code from the synchronization pulse and camera code inserter.

In another further embodiment, the camera unit includes a camera generating an image signal, a video synchronization separator sending the synchronization pulse from the video camera line to the camera, a camera current driver converting the image signal from the camera into a video image signal being in a current mode, an enable switch inserting the video image signal from the camera current driver onto the video camera line upon receiving an enable signal, and a camera code decoder sending an enable signal to the enable switch upon sensing a camera code on the video camera line corresponding to the camera code for the associated camera unit.

In yet another further embodiment, the camera unit comprises a camera generating an image signal and a camera synchronization signal, a video synchronization separator sending the synchronization pulse from the video camera line to the camera, a video synchronization remover blanking the camera synchronization signal from the camera in response to a blanking signal from the video synchronization separator, a camera current driver converting the image signal from the camera into a video image signal being in a current mode, an enable switch inserting the video image signal from the camera current driver onto the video camera line upon receiving an enable signal, and a camera code decoder sending an enable signal to the enable switch upon sensing a camera code corresponding to the camera code for the associated camera unit.

In yet another further embodiment, the synchronization pulses inserted onto the video camera line are synchronized with the cycles of an input power supply.

In another embodiment, the system includes a video camera line, a video system controller connected to the video camera line which inserts a synchronization pulse on the video camera line, and at least one camera unit connected to the video camera line which inserts a video image signal on the video camera line in synchronization with the synchronization pulses placed on the video camera line by the video system controller.

BRIEF DESCRIPTION OF THE DRAWINGS

These and other features, aspects, and advantages of the present invention will become better understood with regard to the following description, appended claims, and accompanying drawing where:

DESCRIPTION

Figure 1:
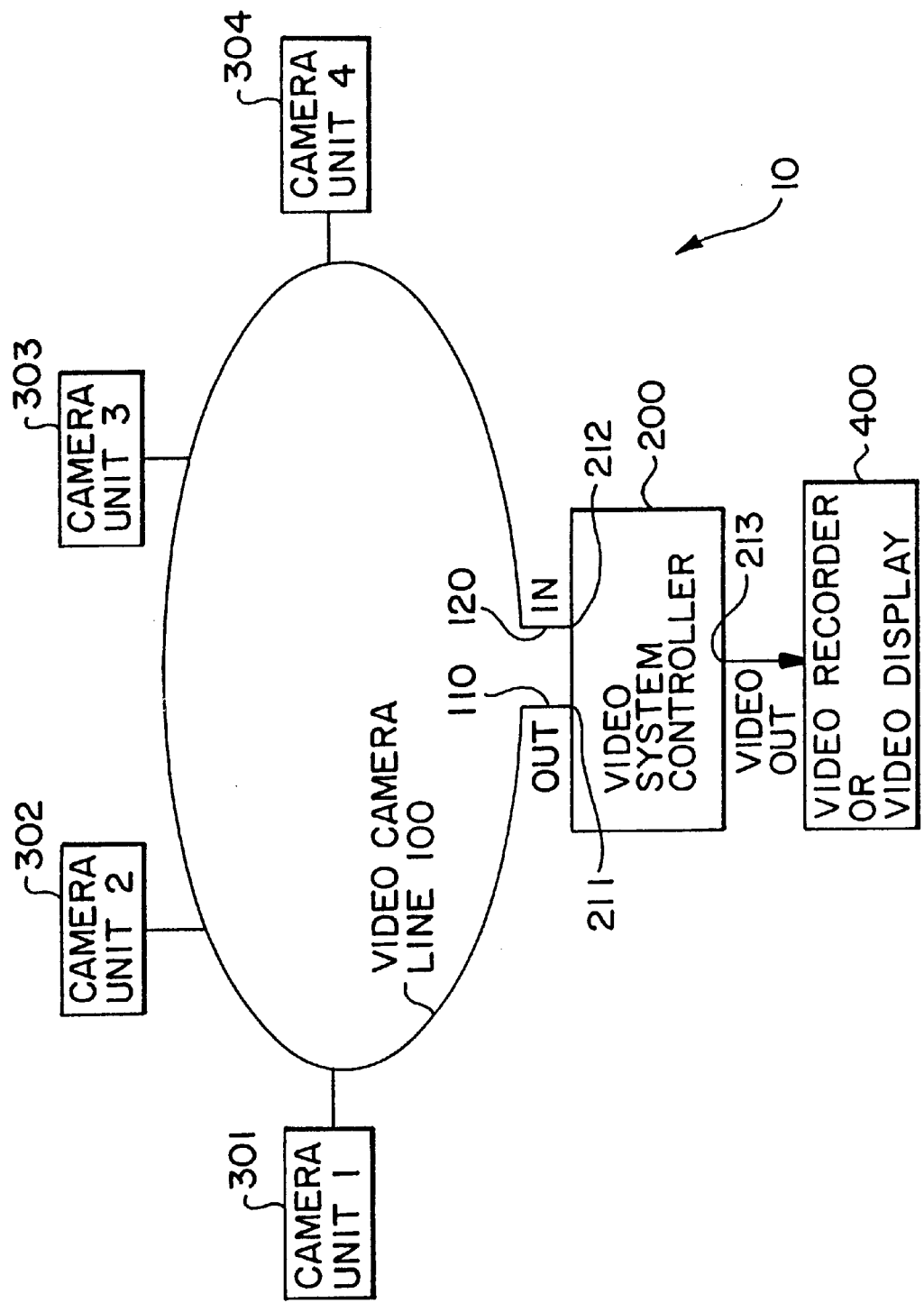
FIG. 1 illustrates a block diagram of one embodiment of the present invention.
Figure 2:
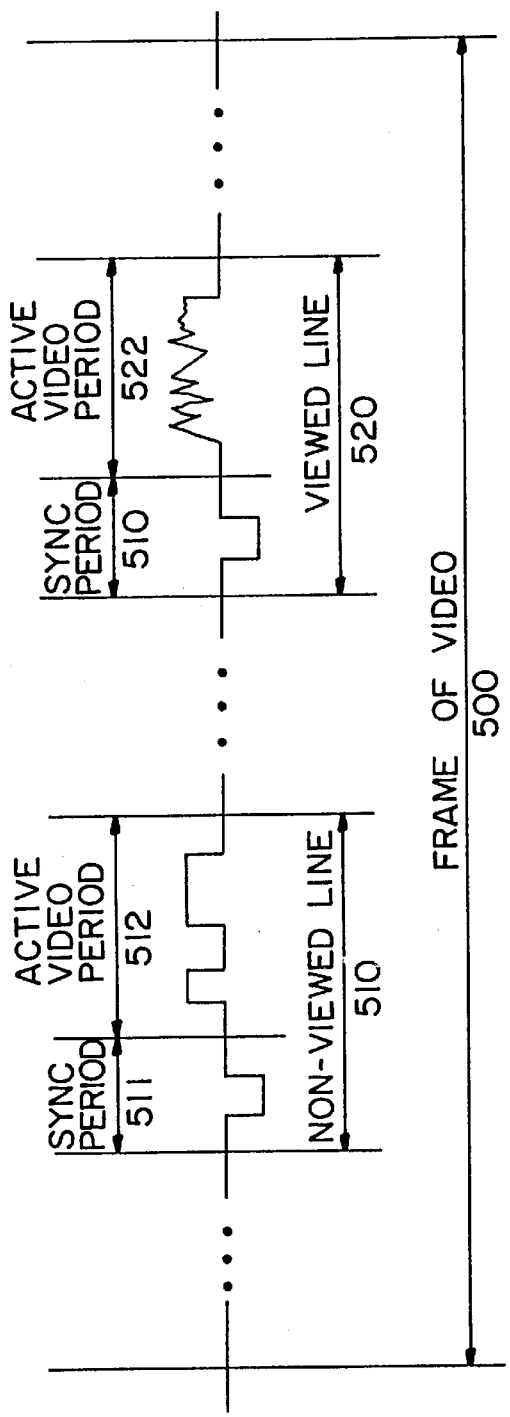
FIG. 2 illustrates a frame of video having a non-viewed video line and a viewed video line.
Figure 3:
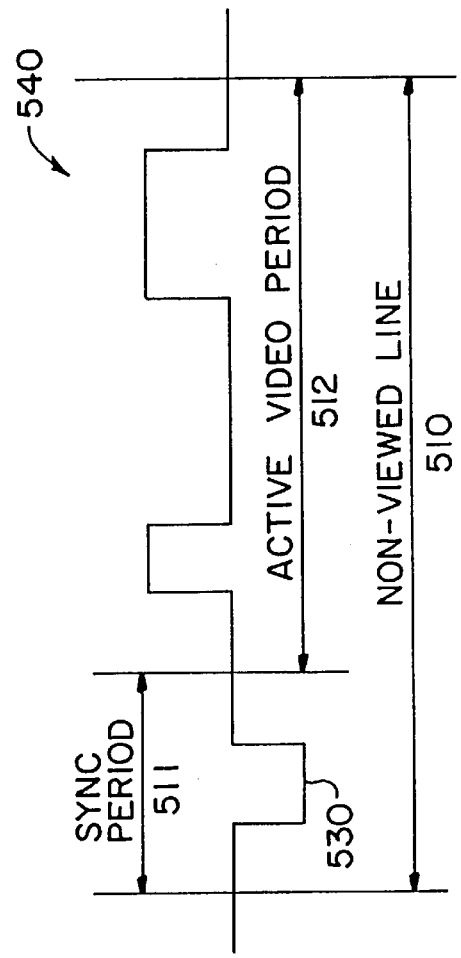
FIG. 3 illustrates a non-viewed video line from a frame of video created by the video system controller in FIG. 1, the non-viewed video line having a synchronization pulse and a camera code therein.
Figure 4:
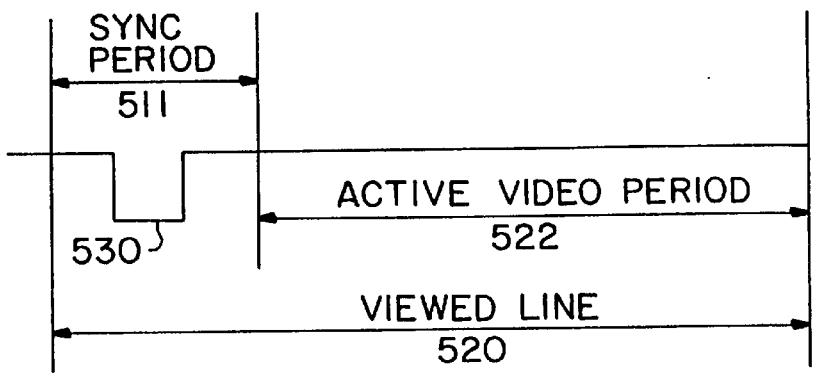
FIG. 4 illustrates a viewed video line from a frame of video created by the video system controller in FIG. 1, the viewed video line having a synchronization pulse therein.
Figure 5:
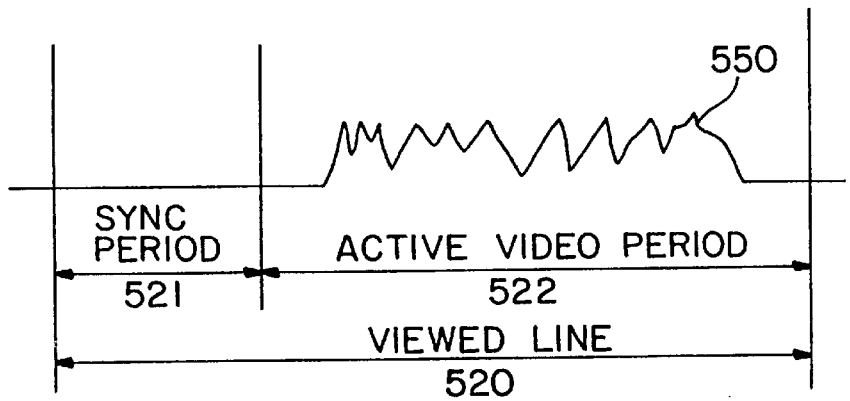
FIG. 5 illustrates a viewed video line from a frame of video generated by one of the camera units from FIG. 1, the viewed video line having a video signal and no synchronization signal.
Figure 6:
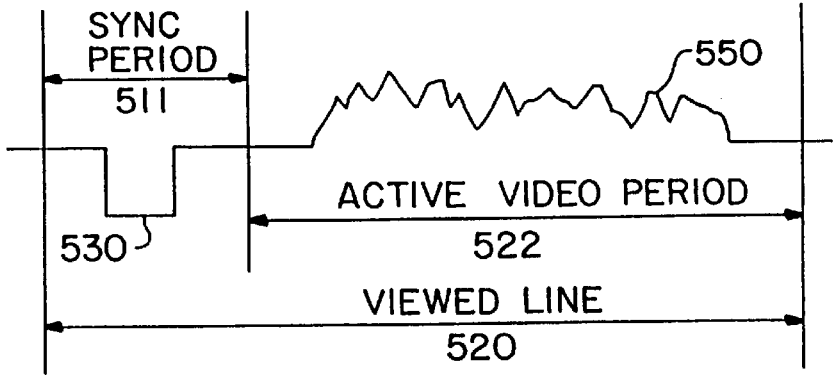
FIG. 6 illustrates a viewed video line from a frame of video on the video cable from FIG. 1, the viewed video line having a composite of the synchronization pulse inserted into synchronization time period by the system video system controller from FIG. 1 and a video signal added to active video time period of the viewed video line by one of the camera units from FIG. 1.
Figure 7:
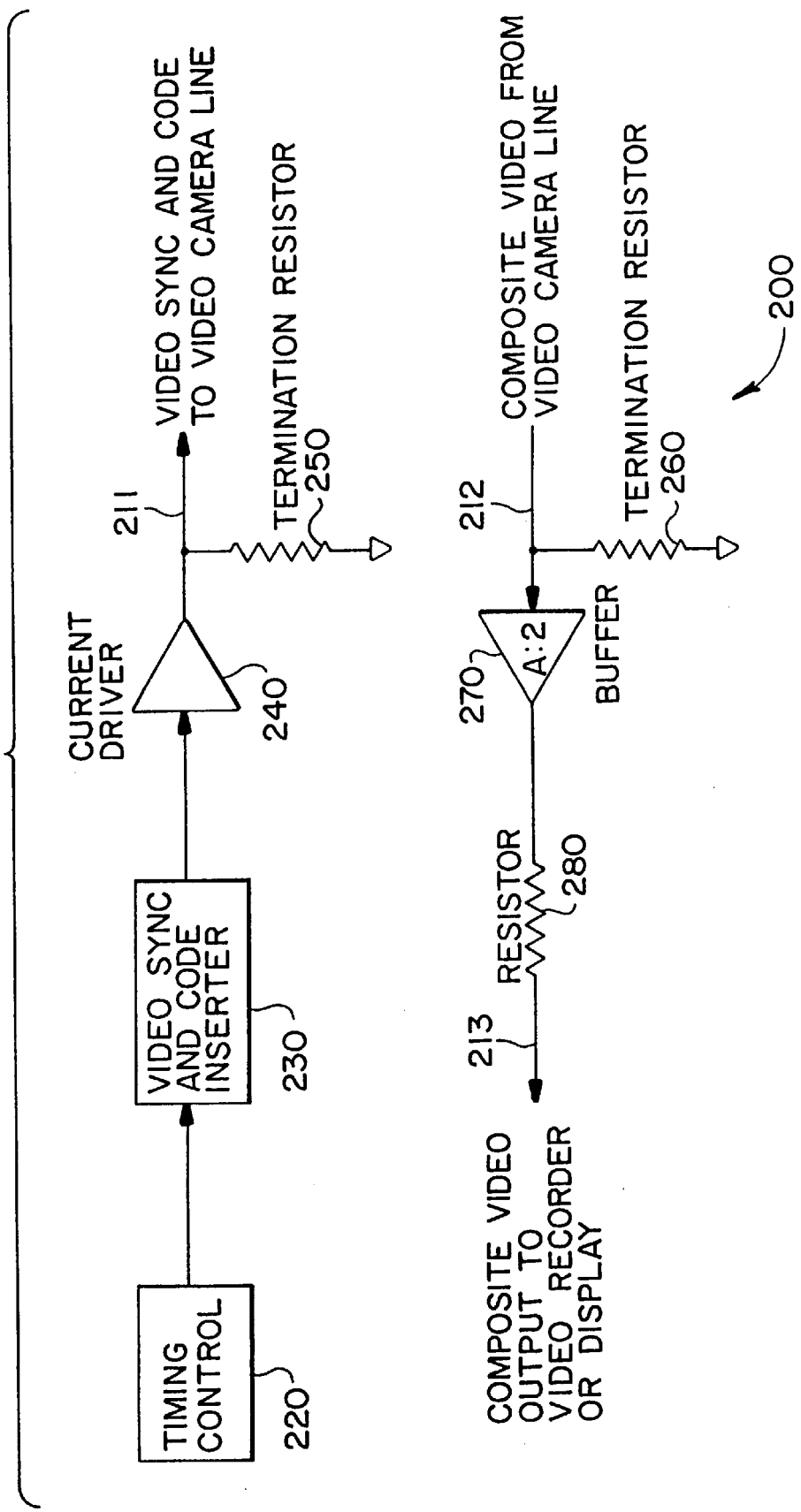
FIG. 7 illustrates a block diagram of the video system controller from FIG. 1.
Figure 8:
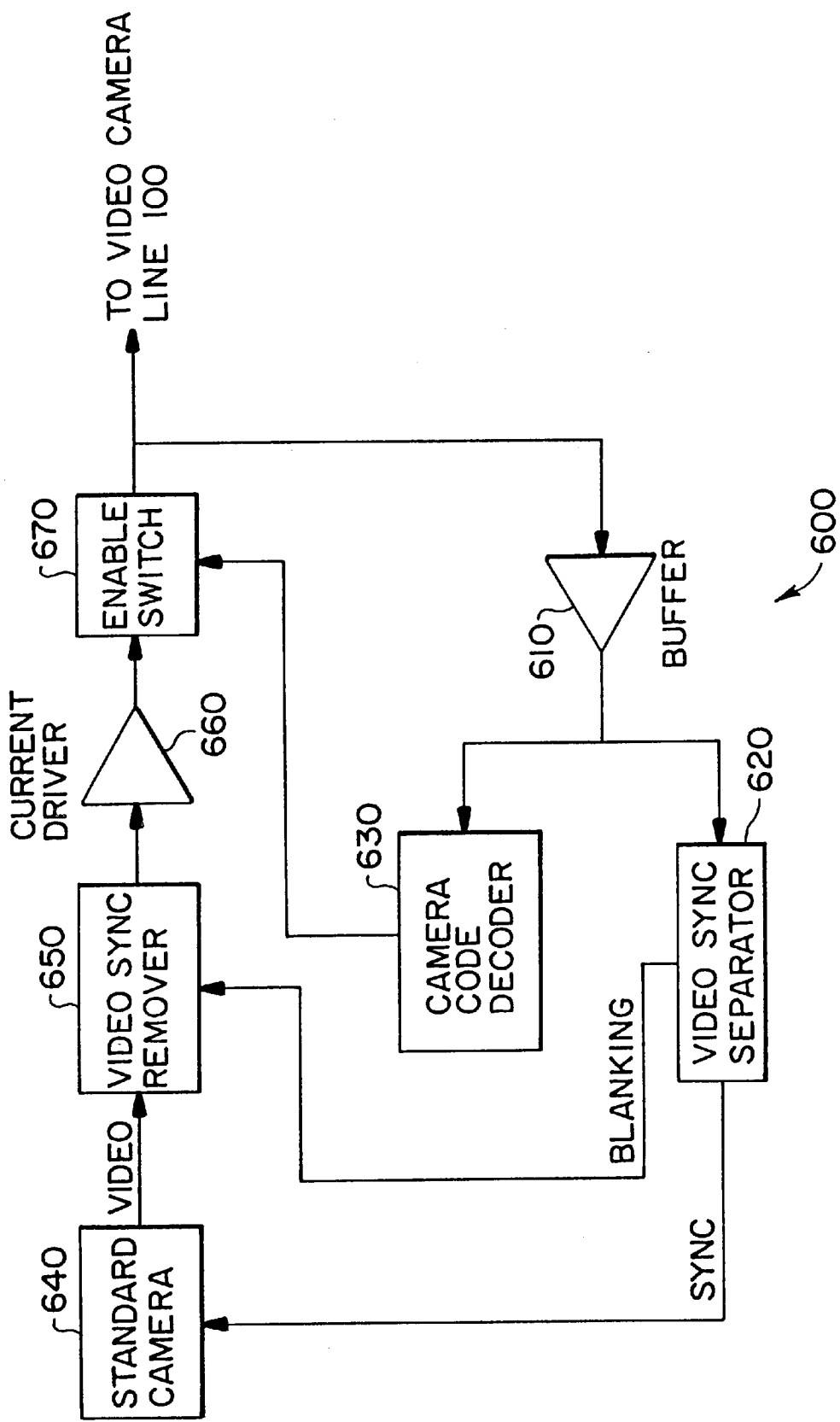
FIG. 8 illustrates a block diagram of one embodiment of one of the camera units from FIG. 1.
Figure 9:
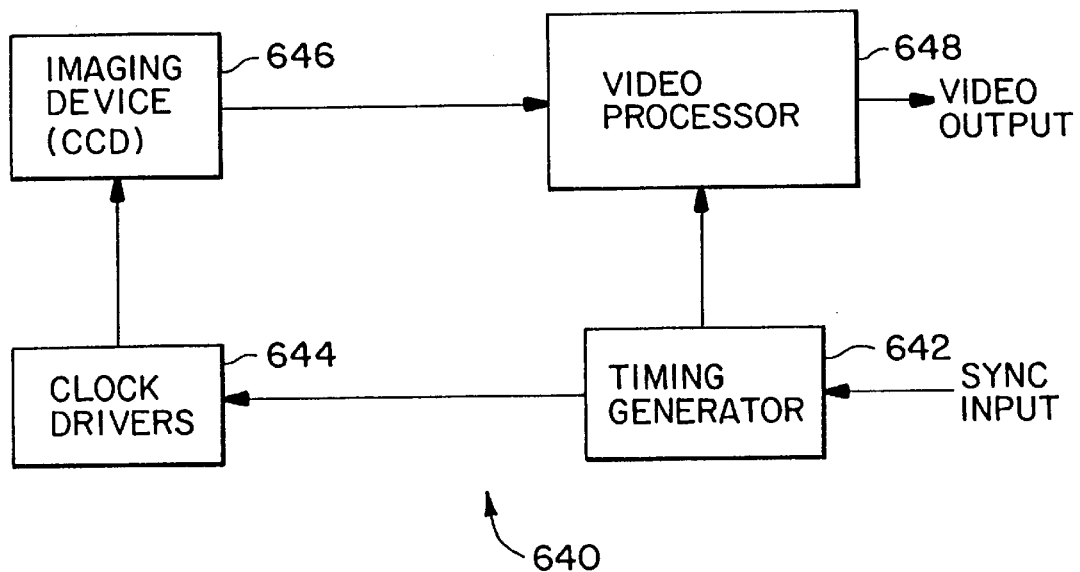
FIG. 9 illustrates a block diagram of the camera unit from FIG. 8.
Figure 10:
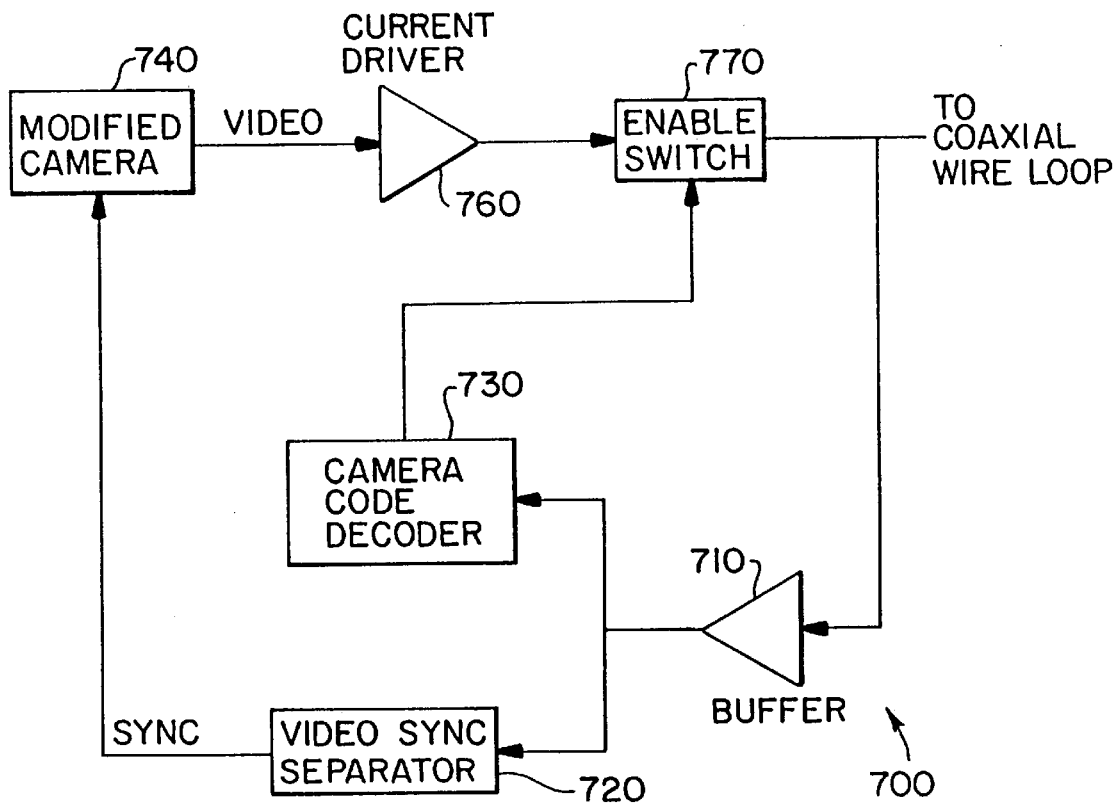
FIG. 10 illustrates a block diagram of another embodiment of one of the camera units from FIG. 1.
Figure 11:
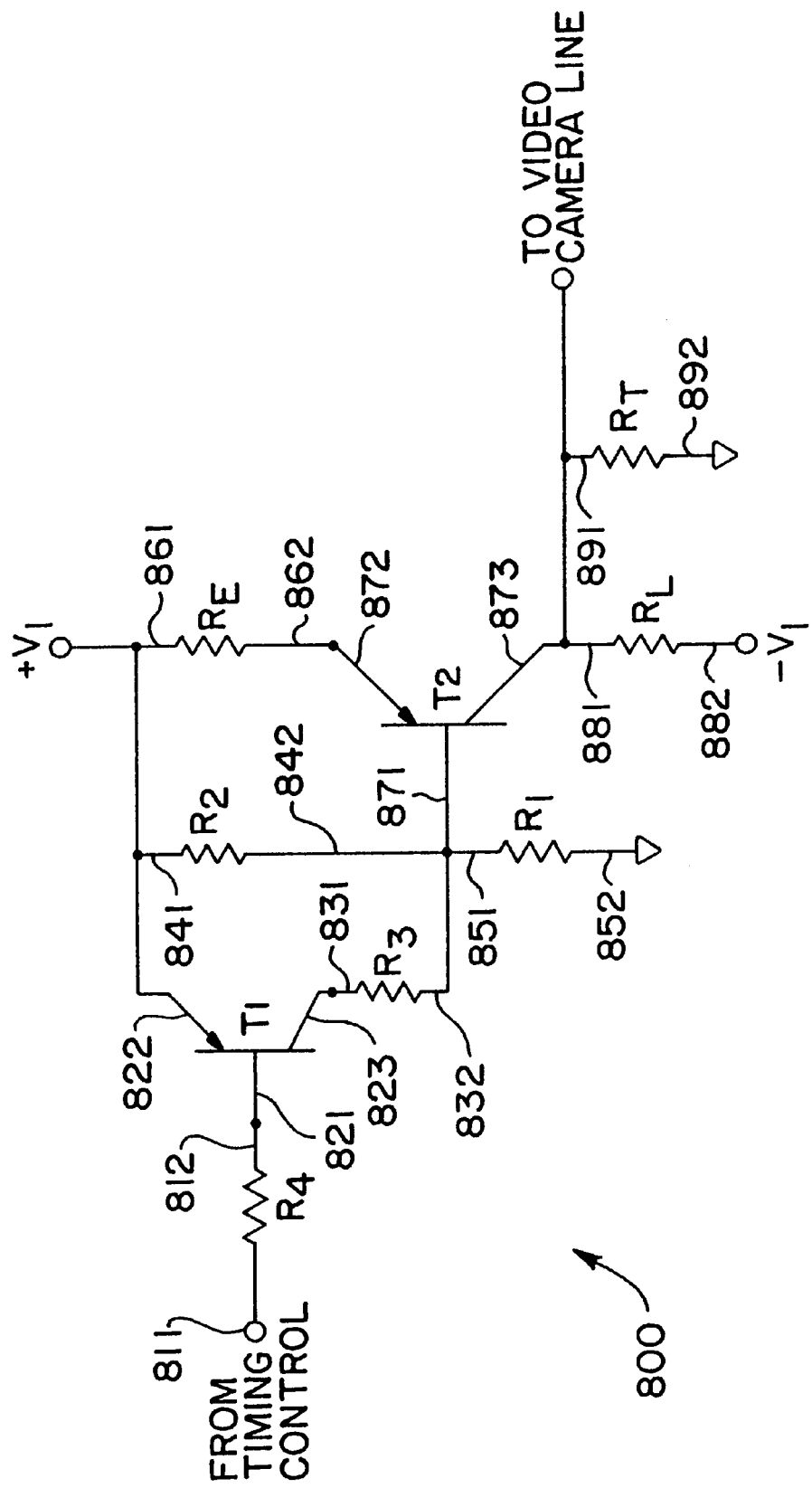
FIG. 11 illustrates a schematic of an embodiment of a synchronization pulse insertion aspect of the video synchronization and code inserter and the current driver from the video system controller in FIG. 7.
Figure 12:
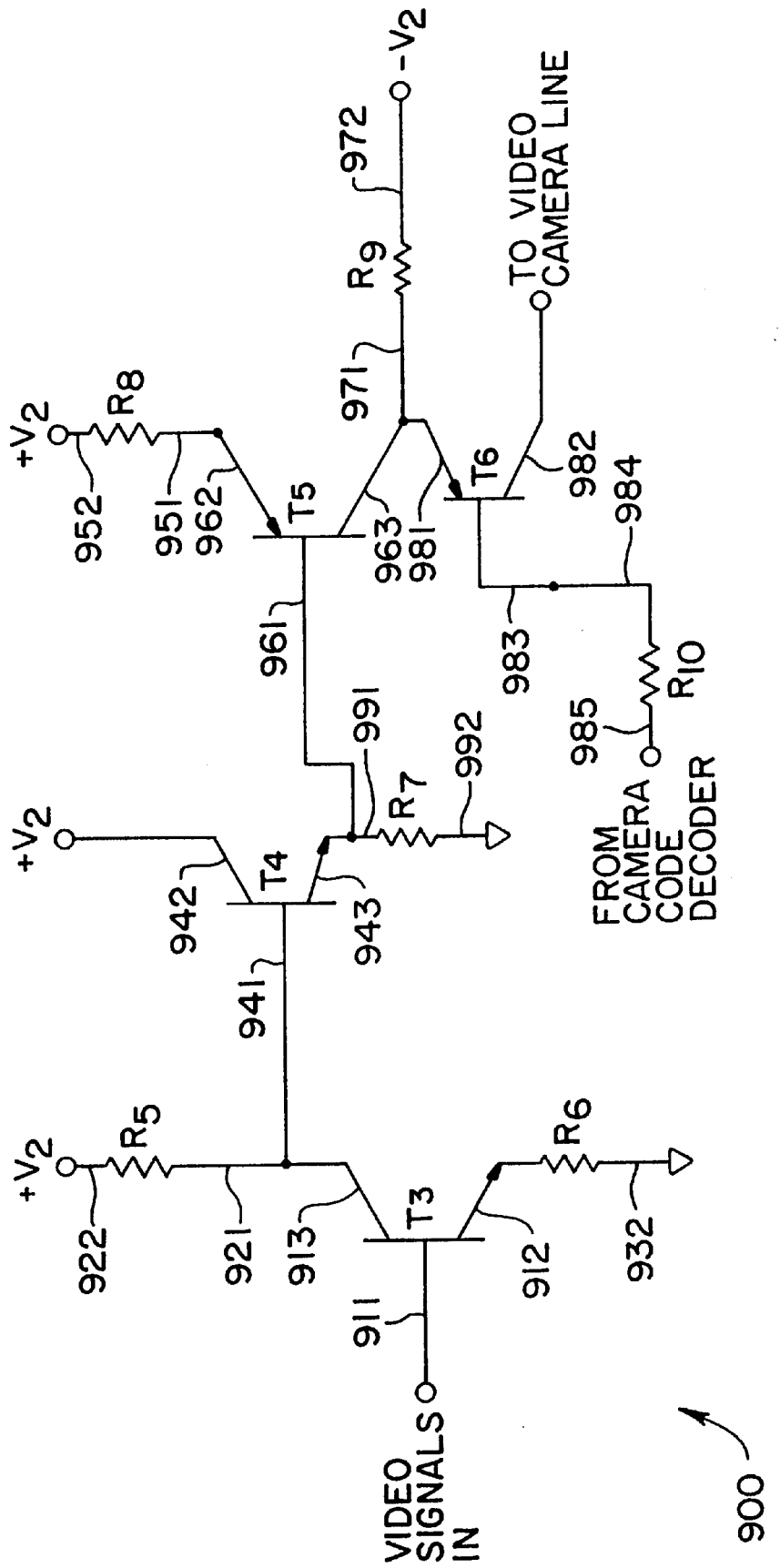
FIG. 12 illustrates a schematic of an embodiment of the enable switch and the current driver from the camera unit in FIG. 8 or FIG. 10.

Referring now to the drawings, there is shown a video multiplexer system 10 illustrating one embodiment of the present invention. The video multiplexer system 10 generally comprises a video camera line or cable 100, a video system controller 200, video camera units 301, 302, 303, and 304, and a video recorder or display 400. The video camera line 100 has a first end 110 which is connected to an output 211 of the video system controller 200, and a second end 120 which is connected to an input 212 of the video system controller 200. In one embodiment of the present invention, the video camera line 100 is a single coaxial cable. The video camera units 301, 302, 303, and 304, are connected to the video camera line 100 between the first end 110 and the second end 120. A video output 213 of the video system controller 200 sends video image signals from the video system controller 200 to the video recorder or display 400.

In one embodiment of the present invention, frames of video 500 are made up of multiple video lines, including non-viewed video lines 510 and viewed video lines 520. Each of the video lines 510 and 520 in a frame of video 500 further include synchronization time periods 511 and 521, respectively, and active video time periods 512 and 522, respectively. The video system controller 200 partially creates frames of video 500 on the video camera line 100 by inserting synchronization pulses 530 on the video camera line 100 in the synchronization signal time periods 511 and 521 of the video lines 510 and 520 for the frames of video 500. In one embodiment, the video synchronization pulses 530 generated by the system video controller 200 are standard video synchronization pulses with the proper current to provide the standard video synchronization pulse amplitude to the video camera line 100. During the active video time periods 512 in the normally non-viewed video lines 510 of the frame of video 500, the video system controller 200 also inserts camera codes 540 onto the video camera line 100. In one embodiment, the camera codes 540 comply with standard video amplitudes.

The video synchronization pulses 530 inserted on the video camera line 100 by the video system controller 200 are used by the video camera units 301, 302, 303, and 304, to remain synchronized within the video multiplexer system 10. Each of the video camera units 301, 302, 303, and 304 will generate a video image signal 550 during the active video time period 521 of the viewed video lines 520 for the frames of video 500. The camera code 540 inserted on the video camera line 100 by the video system controller 200 will correspond with one of the video camera units 301, 302, 303, and 304. Upon sensing a camera code 540 on the video camera line 100, the corresponding camera unit 301, 302, 303, or 304 will insert the video image signal 550 generated by the corresponding camera unit onto the video camera line 100 in the active video time period 522 of the viewed video line 520 for the frame of video 500. The insertion of the video image signal 550 onto the video camera line 100 will add the video image signal 550 to the synchronization pulse 530 in the viewed video line 520, resulting in a frame of video 500 having a viewed video line 520 with a composite of the synchronization pulse 530 in the synchronization time period 521 and the video image signal 550 in the active video time period 522.

The video system controller 200 receives the frame of video 500 containing the composite of the synchronization pulse 530 and the video image signal 550, at the input 212. Upon receiving the frame of video 500 containing the composite of the synchronization pulse 530 and the video image signal 550, the video system controller 200 sends the appropriate video image signal through the video output 213 to the video recorder or display 400.

In one embodiment, the video system controller 200 comprises a timing control 220, a video synchronization pulse and camera code inserter 230, a current driver 240, termination resistors 250 and 260, a buffer 270, and a resistor 280. The timing control 220 is preferably a logic device such as a microcontroller, programmable logic device, or application specific integrated circuit (ASIC) which determines the functions of the video system controller 200. The timing control 220 generates the synchronization pulses 530 which the video multiplexer system 10 uses to synchronize the camera units 301, 302, 303, and 304, and the other components of the video multiplexer system 10. The timing control 220 can be programmed to generate the synchronization pulses 530 at a fix time period, vary the timing period at different times, varying the timing period upon sensing a change in an input condition, or to synchronize the synchronization pulses with the cycling of an input. For example, the timing control 220 can be programmed to generate the synchronization pulses in synchronization with the input power cycles, thereby synchronizing the camera units 301, 302, 303, and 304 with the input power and creating a condition known as "lock line." In a "lock line" condition, the camera units 301, 302, 303, and 304 take video images at the same cycle location for each of the input power cycles. Other electrical devices using the same electrical input power will also be at the same cycle location of each of the input power cycles when the camera units 301, 302, 303, and 304, in a "lock line" condition, take video images. Thus, the video images taken by the camera units 301, 302, 303, and 304 in a "lock line" condition will not be influenced by other electrical devices which have different conditions at different locations of the input power cycles, such as the varying color of a florescent light at each different location of an input power cycle.

The timing control 220 also generates the camera codes 540 that controls which camera unit 301, 302, 303, or 304 is active during each frame of video 500. The determination of the sequence of active camera units, or which camera unit is displayed or recorded, is determined by the timing control 220. The decision on which video camera unit is utilized may be based on a set timing mode, by monitoring alarms, or other conditions which may require the camera multiplexing to change. Therefore, the timing control 220 controls the multiplexing action of the video multiplexer system 10 by determining which camera unit 301, 302, 303, or 304, is active for each frame of video 500, and controls the operation of the entire video multiplexer system 10 based on a logic designed specifically for the application desired. The video synchronization and camera code inserter 230 and the current driver 240 convert the synchronization pulses 530 and the camera codes 540 into a current mode and inserts them into the appropriate video lines 510, 520 of the frame of video 500 on the video cable 100 through the output 211.

The frame of video 500 having the composite of the synchronization pulse 530 from the video system controller 200 and the video image signal 550 from one of the camera units 301, 302, 303, or 304, returns on the video camera line 100 to the video system controller 200 through the input 212. In one embodiment of the present invention, the composite frame of video 500 returning to the video system controller 200 also includes the camera codes 540 inserted onto the video camera line 100 by the video system controller 200. The composite frame of video passes through a buffer 270 and a resistor 280 to the video output 213 of the video system controller 200 to the video recorder or display 400. In one embodiment, the buffer 270 has a gain of two. The termination resistors 250 and 260 are connected to the first end 110 and the second end 120 of the video camera line 100, respectively, through the output 211 and input 212, respectively, of the video system controller 200. The termination resistors 250 and 260 help prevent reflection in the video camera line 100.

In one embodiment, the video camera units 301, 302, 303, or 304, are of the type of camera unit 600 which utilizes a standard camera 640. In the camera unit 600, the frames of video 500 which are inserted on the video camera line 100 by the video system controller 200 are received by a buffer 610. The buffer 610 allows the synchronization pulses 530 and the camera codes 540 placed on the video camera line 100 by the video system controller 200 to be inputted into a video synchronization separator 620 and a camera code decoder 630 of the camera unit 600 without affecting frame of video 500 on the video camera line 100. The video synchronization separator 620 reads the synchronization pulses 530 from the incoming frames of video 500 and sends those synchronization pulses 530 to a standard camera 640 and a video synchronization remover 650.

The standard camera 640 uses the synchronization pulses 530 to remain synchronized with the other camera units and components of the video multiplexer system 10. A timing generator 642 in the standard camera 640 receives the synchronization signals 530 from the video synchronization separator 620 and generates a timing signal based on the synchronization pulse 530 in the frames of video 500. In one embodiment, the video synchronization separator 620 is a video sync separator model EL4583C, manufactured by elantec in Milpitas, Calif. The timing signal(s) generated by the timing generator 642 is supplied to a clock driver 644 and a video processor 648. The clock driver 644 drives an imaging device (CCD) 646 to create an image which is sent to the video processor 648. The video processor 648 sends a video output signal, having a camera synchronization signal thereon, to the video synchronization remover 650.

The video synchronization remover 650 removes the synchronization signals normally generated by the standard camera 640 by blanking the video synchronization signals (both vertical and horizontal) from the video signal being output by the standard camera 640. Therefore, the viewed video line 520 of the frame of video 500 which is output by the video synchronization remover 650, will only have the video image signals 550 in the active time period 522. A current driver 660 converts the video signals from the video synchronization remover 650 to a current signal which is supplied to an enable switch 670.

The camera code decoder 630 reads the camera code 540 from the frame of video 500 supplied to the camera code decoder 630 by the buffer 610. In one embodiment, the camera code decoder 630 is a logic device such as a microcontroller, programmable logic device, or application specific integrated circuit (ASIC). If the camera code inserted on the video camera line 100 by the video system controller 200 corresponds to the camera unit having the camera code decoder 630, then the camera code decoder 630 transmits an enable signal to the enable switch 670. Upon receiving an enable signal from the camera code decoder 630, the enable switch 670 connects the current driver 660 with the video camera line 100, thereby inserting the video image signals from the current driver 660 onto the video camera line 100. In one embodiment, upon receiving a camera code 540 associated with the particular camera unit, the camera code decoder 630 sends the enable signal to the enable switch 670 and continues to send the enable signal to the enable switch 670 until the camera code decoder 630 receives a camera code 540 which is not associated with the particular camera unit. A person of ordinary skill will recognize that other methods of inserting the video signals onto the video camera line 100, such as the camera code decoder 630 sending a start and stop enable signal to the enable switch 670, the enable switch 670 remaining connected between the current driver 660 and the video camera line 100 for a frame of video upon receiving a triggering enable signal from the camera code decoder 630, the enable switch 670 activating upon the absence of an enable signal from the camera code decoder 630, or the like. Therefore, when the camera code 540 in a frame of video 500 on the video camera line 100 does not correspond with the camera code required for a specific one of the camera units 600, the specific camera unit 600 will not insert a video image signal 550 onto the video camera line 100.

In another embodiment, the video camera units 301, 302, 303, or 304, are of the type of camera unit 700 which utilizes a modified camera 740. In the camera unit 700, the frames of video 500, which are inserted on the video camera line 100 by the video system controller 200, are received by a buffer 710. The buffer 710 allows the synchronization pulses 530 and the camera codes 540 placed on the video camera line 100 by the video system controller 200, to be inputted into a video synchronization separator 720 and a camera code decoder 730 of the camera unit 700 without affecting frame of video 500 on the video camera line 100. In one embodiment, the camera code decoder 730 is a logic device such as a microcontroller, programmable logic device, or application specific integrated circuit (ASIC). The video synchronization separator 720 reads the synchronization pulses 530 from the incoming frames of video 500 and sends those synchronization pulses 530 to the modified camera 740. In one embodiment, the video synchronization separator 720 is a video sync separator model EL4583C, manufactured by èlantec in Milpitas, Calif. The modified camera 740 differs from the standard camera 640 in that the output signal from the modified camera 740 does not have a synchronization signal. A current driver 760 converts video signal from the modified camera 740 into a current signal and supplies that current signal to the enable switch 770.

The camera code decoder 730 reads the camera code 540 from the frame of video 500 supplied to the camera code decoder 730 by the buffer 710. If the camera code inserted on the video camera line 100 by the video system controller 200 corresponds to the camera unit having the camera decoder 730, then the camera code decoder 730 transmits an enable signal to the enable switch 770. Upon receiving an enable signal from the camera code decoder 730, the enable switch 770 inserts the video image signals from the current driver 760, onto the video camera line 100. In one embodiment, upon receiving a camera code 540 associated with the particular camera unit, the camera code decoder 730 sends the enable signal to the enable switch 770 and continues to send the enable signal to the enable switch 770 until the camera code decoder 730 receives a camera code 540 which is not associated with the particular camera unit. A person of ordinary skill will recognize that other methods of inserting the video signals onto the video camera line 100, such as the camera code decoder 730 sending a start and stop enable signal to the enable switch 770, the enable switch 770 remaining connected between the current driver 760 and the video camera line 100 for a frame of video upon receiving a triggering enable signal from the camera code decoder 730, the enable switch 770 activating upon the absence of an enable signal from the camera code decoder 730, or the like. Therefore, when the camera code 540 in a frame of video 500 on the video camera line 100 does not correspond with the camera code required for a specific one of the camera units 700, the specific camera unit 700 will not insert a video image signal 550 onto the video camera line 100.

In one embodiment, a synchronization pulse insertion aspect of the video synchronization and camera code inserter 230 and the current driver 240 of the video system controller 200 are comprised of the schematic 800. In the schematic 800, a first end 811 of a resistor $R_4$ receives signals from the timing control 220. A second end 812 of the resistor $R_4$ is connected to a base 821 of a PNP transistor $T_1$. An emitter 822 of the transistor $T_1$ is connected to a first end 841 of a resistor $R_2$, a first end 861 of a resistor $R_E$, and a positive pole of a first voltage supply $V_1$. A collector 823 of the transistor $T_1$ is connected to a first end 831 of a resistor $R_3$. A second end 832 of the resistor $R_3$ is connected to a second end 842 of the resistor $R_2$, a first end 851 of a resistor $R_1$, and a base 871 of a PNP transistor $T_2$. A second end 852 of the resistor $R_1$ is connected to ground. An emitter 872 of the transistor $T_2$ is connected to a second end 862 of the resistor $R_E$. A collector 873 of the transistor $T_2$ is connected to a first end 881 of a resistor $R_L$, a first end 891 of a resistor $R_T$, and to the video camera line 100. A second end 882 of the resistor $R_L$ is connected to a negative pole of the first voltage supply $V_1$. A second end 892 of the resistor $R_T$ is connected to ground. A camera code insertion aspect of the video synchronization and camera code inserter 230 and the current driver 240 is comprised of a schematic similar to the schematic 800.

In one embodiment, the current driver 660 and the enable switch 670 of the camera unit 600, or the current driver 760 and the enable switch 770 of the camera unit 700, are comprised of the schematic 900. In the schematic 900, a base 911 of an NPN transistor $T_3$ receives video signals from either the video synchronization remover 650 of the camera unit 600, or the modified camera 740 of the camera unit 700. An emitter 912 of the transistor $T_3$ is connected to a first end of a resistor $R_6$. A second end 932 of the resistor $R_6$ is connected to ground. A collector 913 of the transistor $T_3$ is connected to a first end 921 of a resistor $R_5$ and a base 941 of an NPN transistor $T_4$. A second end 922 of the resistor $R_5$ is connected to a positive pole of a second voltage supply $V_2$. A collector 942 of the transistor $T_4$ is also connected to the positive pole of the second voltage supply $V_2$. An emitter 943 of the transistor $T_4$ is connected to a first end 991 of a resistor $R_7$ and a base 961 of a PNP transistor $T_5$. A second end 992 of the resistor $R_7$ is connected to ground. An emitter 962 of the transistor $T_5$ is connected to a first end 951 of a resistor $R_8$. A second end 952 of the resistor $R_8$ is connected to the positive pole of the second voltage supply $V_2$. A collector 963 of the transistor $T_5$ is connected to a first end of a resistor $R_9$ and an emitter 981 of a PNP transistor $T_6$. A second end 972 of the resistor $R_9$ is connected to a negative pole of the second voltage supply $V_2$. A collector 982 of the transistor $T_6$ connects with the video camera line 100. A base 983 of the transistor $T_6$ is connected to a first end 984 of a resistor $R_{10}$. A second end 985 of the resistor $R_{10}$ connects with the camera code decoder 630 of the camera unit 600, or the camera code decoder 730 of the camera unit 700.

The video image signals 550 supplied by the camera unit 600 or the camera unit 700 to the video camera line 100 are without synchronization pulses and are summed with the synchronization pulses 530 provided by the video system controller 200 using current mode. Therefore, the video is "built" on the video camera line 100 by the video system controller 200 and the camera unit 301, 302, 303, or 304 selected by the video system controller 200. The video camera line 100 acts as a summing node for the current drive 240 of the video system controller 200 and the current drive 660, 760 of the camera unit 600, 700.

Since the camera units 301, 302, 303, and 304 and the video controller 200 interface to the video camera line 100 through a current mode, the video camera line 100 acts as a summing node allowing an unlimited number of cameras to be placed on the video camera line 100. Since the video synchronization pulses 530 are placed on the video camera line 100 by the video system controller 200, all of the camera units 301, 302, 303, and 304 use the same synchronization pulses 530 on the video camera line 100 to synchronize themselves to the video system controller 200 without the use of separate synchronization wires. Also, because the video camera line 100 acts as the summing node for the multiplexer, the camera units 301, 302, 303, and 304 do not need separate multiplexing cables to connect with a multiplexer. Furthermore, the video system controller 200 which can be programmed to multiplex the camera units 301, 302, 303, and 304 according to many different parameters which are programed into the video system controller 200.

Although the present invention has been described in considerable detail with reference to certain preferred embodiments thereof, other embodiments are possible. For example, the video cable 100 can be a single line with many branches for the individual cameras, with the input and output connected to the same base location of the trunk of the single line. As another example, other arrangements of camera components can be utilized which will generate only the video signal to be inserted in blank frames generated by the signal controller. Therefore, the spirit and scope of the appended claims should not be limited to the description of the preferred embodiment contained herein.

What is claimed is:

1. A system for generating a composite video signal having a composite video synchronization pulse in a composite synchronization signal time period and a composite video image signal in a composite active video time period, said system comprising:

a video camera line;

a video system controller for inserting onto said video camera line the composite video synchronization pulse during the composite synchronization signal time period of the composite video signal;

a camera unit for receiving the composite video synchronization pulse on said video camera line, for generating a camera video image signal timed to the composite video synchronization pulse, and for inserting the camera video image signal onto said video camera line during the composite active video time period of the composite video signal as the composite video image signal and wherein said camera unit further comprises video synchronization remover to remove any composite synchronization pulse created by said camera unit; and whereby said composite video signal comprises a composite video synch pulse from said video systems controller and a video image signal from said camera unit.

2. The system according to claim 1, wherein said video system controller further comprises:

a timing control for generating a timing signal;

a synchronization pulse inserter for receiving the timing signal of said timing control and outputting the composite video synchronization pulse in response thereto for insertion onto said video camera line during the composite synchronization signal time period of the composite video signal.

3. The system according to claim 1, wherein the camera unit further comprises:

a video synchronization separator for reading the composite video synchronization pulse on said video camera line and for outputting the composite video synchronization pulse therefrom;

a camera for receiving the composite video synchronization pulse from said video synchronization separator and for generating a camera video image signal timed to the composite video synchronization pulse; and wherein said camera unit inserts the camera video image signal of said camera onto said video camera line during the composite active video time period of the composite video signal as the composite video image signal.

4. The system according to claim 1, wherein said camera unit further comprises:

a video synchronization separator for reading the composite video synchronization pulse on said video camera line and for outputting the composite video synchronization pulse therefrom;

a camera for receiving the composite video synchronization pulse from said video synchronization separator, and for generating a camera video signal having a camera video image signal timed to the composite video synchronization pulse and a camera video synchronization signal;

wherein said video synchronization remover operates by blanking the camera video synchronization signal in the camera video signal and outputting the camera video image signal therefrom; and wherein said camera unit inserts the camera video image signal from said video synchronization remover onto the video camera line during the composite active video time period of the composite video signal as the composite video image signal.

5. The system according to claim 1, wherein said video system controller inserts the composite video synchronization pulse on said video camera line such that the composite video synchronization pulse is synchronized with an alternating current input power supply.

6. A system for generating a composite video signal having a composite video synchronization pulse in a composite synchronization signal time period and a composite video image signal in a composite active video time period, said system comprising:

a video camera line;

a video system controller for inserting onto said video camera line the composite video synchronization pulse during the composite synchronization signal time period of the composite video signal and for inserting one of a plurality of camera codes onto said video camera line;

a plurality of camera units, each one of said plurality of camera units associated with a different one of the plurality of camera codes of said video system controller, each one of said plurality of camera units for receiving the composite video synchronization pulse and the camera code on said video camera line, for generating a camera video image signal timed to the composite video synchronization pulse, and for inserting the camera video image signal onto said video camera line during the composite active video time period of the composite video signal as the composite video image signal in response to receiving the one of the plurality of camera codes on said video camera line which is associated with the particular one of said plurality of camera units and wherein each of said camera units further comprises video synchronization remover to remove any composite synchronization pulse created by each of said camera units; and whereby said composite video signal comprises a composite video synch pulse from said video systems controller and a video image signal from at least one of said camera units.

7. The system according to claim 6, wherein said video system controller further comprises:

a timing control for generating a timing signal and the one of the plurality of camera codes;

a synchronization pulse and camera code inserter for receiving the timing signal of said timing control and outputting the composite video synchronization pulse in response thereto for insertion onto said video camera line during the composite video synchronization signal time period of the composite video signal, and for receiving the one of the plurality of camera codes from said timing control and outputting the one of the plurality of camera codes in response thereto for insertion onto said video camera line.

8. The system according to claim 6, wherein at least one of said plurality of camera units further comprises:

a video synchronization separator for reading the composite video synchronization pulse on said video camera line and for outputting the composite video synchronization pulse therefrom;

a camera for receiving the composite video synchronization pulse from said video synchronization separator and for generating a camera video image signal timed to the composite video synchronization pulse;

a camera code decoder for reading the camera code on said video camera line and for generating an enable signal upon sensing the one of said plurality of camera codes which is associated with the particular camera unit; and an enable switch for receiving the camera video image signal of said camera and the enable signal of said camera code decoder and for outputting the camera video image signal upon receiving the enable signal for insertion onto said video camera line during the composite active video time period of the composite video signal as the composite video image signal.

9. The system according to claim 6, wherein at least one of said plurality of camera units further comprises:

a video synchronization separator for reading the composite video synchronization pulse on said video camera line and for outputting the composite video synchronization pulse therefrom;

a camera for receiving the composite video synchronization pulse from said video synchronization separator, and for generating a camera video signal having a camera video image signal timed to the composite video synchronization pulse and a camera video synchronization signal;

wherein said video synchronization remover operates by blanking the camera video synchronization signal in the camera video signal and outputting the camera video image signal therefrom;

a camera code decoder for receiving the camera code on said video camera line and for generating an enable signal upon sensing the one of said plurality of camera codes associated with the particular camera unit; and an enable switch for receiving the camera video image signal from said video synchronization remover and the enable signal of said camera code decoder, and for outputting the camera video image signal upon receiving the enable signal for insertion onto said video camera line during the composite active video time period of the composite video signal as the composite video image signal.

10. The system according to claim 6, wherein said video system controller inserts the composite video synchronization pulse on said video camera line such that the composite video synchronization pulse is synchronized with an alternating current input power supply.

11. A system for generating a composite video signal having a composite video synchronization pulse and a composite video image signal, said system comprising:

a video camera line;

a video system controller for inserting the composite video synchronization pulse in a current form onto said video camera line;

a camera unit for receiving the composite video synchronization pulse on said video camera line, for generating a camera video image signal timed to the composite video synchronization pulse, and for inserting the camera video image signal in a current form onto said video camera line as the composite video image signal and wherein said camera unit further comprises video synchronization remover to remove any composite synchronization pulse created by said camera unit; and whereby said composite video signal comprises a composite video synch pulse from said video systems controller and a video image signal from said camera unit.

12. The system according to claim 11, wherein said video system controller further comprises:

a timing control for generating a timing signal;

a synchronization pulse inserter for receiving the timing signal of said timing control and inserting the composite video synchronization pulse in response thereto for insertion in the current form onto said video camera line.

13. The system according to claim 11, wherein the camera unit further comprises:

a video synchronization separator for reading the composite video synchronization pulse on said video camera line and for outputting the composite video synchronization pulse therefrom;

a camera for receiving the composite video synchronization pulse from said video synchronization separator and for generating a camera video image signal timed to the composite video synchronization pulse; and wherein said camera unit inserts the camera video image signal of said camera in the current form onto said video camera line as the composite video image signal.

14. The system according to claim 11, wherein said camera unit further comprises:

a video synchronization separator for reading the composite video synchronization pulse on said video camera line and for outputting the composite video synchronization pulse therefrom;

a camera for receiving the composite video synchronization pulse from said video synchronization separator, and for generating a camera video signal having a camera video image signal timed to the composite video synchronization pulse and a camera video synchronization signal; and wherein said video synchronization remover operates by blanking the camera video synchronization signal in the camera video signal and outputting the camera video image signal therefrom; and wherein said camera unit inserts the camera video image signal from said video synchronization remover in the current form onto the video camera line as the composite video image signal.

15. The system according to claim 11, wherein said video system controller inserts the composite video synchronization pulse on said video camera line such that the composite video synchronization pulse is synchronized with an alternating current input power supply.

16. The system according to claim 11, wherein said video system controller includes a current driver that converts the composite video synchronization pulse into the current form for insertion onto said video camera line and wherein said camera unit includes a current driver that converts the composite video image signal into the current form for insertion onto said video camera line.

17. The system according to claim 11, wherein said video system controller includes a buffer coupled to said video camera line for receiving the composite video signal on said video camera line and for converting the composite video signal from a current form to a standard form.

18. The system according to claim 11, further including said video camera line being a loop having a first end and a second end, said video system controller for inserting the composite video synchronization pulse onto said video camera line at the first end of said video camera line, and said camera unit for inserting the composite video image signal onto said video camera line between the first end and the second end of said video camera line, and the second end of said video camera line for receiving the composite video signal.

19. The system according to claim 18, wherein said video system controller includes a current driver that converts the composite video synchronization pulse into the current form for insertion onto said video camera line and wherein said camera unit includes a current driver that converts the composite video image signal into the current form for insertion onto said video camera line.

20. The system according to claim 18, wherein said video system controller includes a buffer coupled to the second end of said video camera line for receiving the composite video signal on said video camera line and for converting the composite video signal from a current form to a standard form.

21. A system for generating a composite video signal having a composite video synchronization pulse and a composite video image signal, said system comprising:

a video camera line;

a video system controller for inserting the composite video synchronization pulse onto said video camera line in a current form and for inserting one of a plurality of camera codes onto said video camera line;

a plurality of camera units coupled to said video camera line, each one of said plurality of camera units associated with a different one of said plurality of camera codes, each one of said plurality of camera units for receiving the composite video synchronization pulse and the camera code on said video camera line, for generating a camera video image signal timed to the composite video synchronization pulse, and for inserting the camera video image signal onto the video camera line as the composite video image signal in response to receiving the one of the plurality of camera codes on said video camera line which is associated with the particular one of the plurality of camera unit and wherein said camera unit further comprises video synchronization remover to remove any composite synchronization pulse created by said camera unit; and whereby said composite video signal comprises a composite video synch pulse from said video systems controller and a video image signal from at least one of said camera units.

22. The system according to claim 21, wherein said video system controller further comprises:

a timing control for generating a timing signal and the one of the plurality of camera codes;

a synchronization pulse and camera code inserter for receiving the timing signal of said timing control and outputting the composite video synchronization pulse in response thereto for insertion in the current mode onto said video camera line, and for receiving the one of the plurality of camera codes of said timing control and outputting the one of the plurality of camera codes in response thereto for insertion in the current mode onto said video camera line.

23. The system according to claim 21, wherein at least one of said plurality of camera units further comprises:

a video synchronization separator for reading the composite video synchronization pulse on said video camera line and for outputting the composite video synchronization pulse therefrom;

a camera for receiving the composite video synchronization pulse from said video synchronization separator and for generating a camera video image signal timed to the composite video synchronization pulse;

a camera code decoder for reading the camera code on said video camera line and for generating an enable signal upon sensing the one of said plurality of camera codes which is associated with the particular camera unit; and an enable switch for receiving the camera video image signal of said camera and the enable signal of said camera code decoder and for outputting the camera video image signal upon receiving the enable signal for insertion onto said video camera line in the current form as the composite video image signal.

24. The system according to claim 21, wherein at least one of said plurality of camera units further comprises:

a video synchronization separator for reading the composite video synchronization pulse on said video camera line and for outputting the composite video synchronization pulse as an therefrom;

a camera for receiving the composite video synchronization pulse from said video synchronization separator and for generating a camera video signal having a camera video image signal timed to the camera synchronization pulse and a camera video synchronization signal;

wherein said video synchronization remover operates by blanking the camera video synchronization signal in the camera video signal and outputting the camera video image signal therefrom;

a camera code decoder for receiving the camera code on said video camera line and for generating an enable signal upon sensing the one of said plurality of camera codes associated with the particular camera unit; and an enable switch for receiving the camera video image signal from said video synchronization remover and the enable signal of said camera code decoder, and for outputting the camera video image signal upon receiving the enable signal for insertion onto said video camera line in the current form as the composite video image signal.

25. The system according to claim 21, wherein said video system controller inserts the composite video synchronization pulse on said video camera line such that the composite video synchronization pulse is synchronized with an alternating current input power supply.

26. The system according to claim 21, wherein said video system controller includes a current driver that converts the composite video synchronization pulse into the current form for insertion onto said video camera line and wherein said camera unit includes a current driver that converts the composite video image signal into the current form for insertion onto said video camera line.

27. The system according to claim 21, wherein said video system controller includes a buffer coupled to said video camera line for receiving the composite video signal on said video camera line and for converting the composite video signal from a current form to a standard form.

28. The system according to claim 21, further including said video camera line being a loop having a first end and a second end, said video system controller for inserting the composite video synchronization pulse onto said video camera line at the first end of said video camera line, and said camera unit for inserting the composite video image signal onto said video camera line between the first end and the second end of said video camera line, and the second end of said video camera line for receiving the composite video signal.

29. The system according to claim 28, wherein said video system controller includes a current driver that converts the composite video synchronization pulse into the current form for insertion onto said video camera line and wherein said camera unit includes a current driver that converts the composite video image signal into the current form for insertion onto said video camera line.

30. The system according to claim 28, wherein said video system controller includes a buffer coupled to the second end of said video camera line for receiving the composite video signal on said video camera line and for converting the composite video signal from a current form to a standard form.

31. The system according to claim 1, further including said video camera line being a loop having a first end and a second end, said video system controller for inserting the composite video synchronization pulse onto said video camera line at the first end of said video camera line, and said camera unit for inserting the composite video image signal onto said video camera line between the first end and the second end of said video camera line, and the second end of said video camera line for receiving the composite video signal.

32. The system according to claim 6, further including said video camera line being a loop having a first end and a second end, said video system controller for inserting the composite video synchronization pulse onto said video camera line at the first end of said video camera line, and said camera unit for inserting the composite video image signal onto said video camera line between the first end and the second end of said video camera line, and the second end of said video camera line for receiving the composite video signal.

33. A system for generating a composite video signal having a composite video synchronization pulse in a composite synchronization signal time period and a composite video image signal in a composite active video time period, said system comprising:

a video camera line;

a video system controller for inserting onto said video camera line the composite video synchronization pulse during the composite synchronization signal time period of the composite video signal;

a camera unit for receiving the composite video synchronization pulse on said video camera line, for generating a camera video image signal timed to the composite video synchronization pulse, and for inserting the camera video image signal onto said video camera line during the composite active video time period of the composite video signal as the composite video image signal and wherein said camera unit is constructed so that no composite synchronization pulse is created by said camera unit; and whereby said composite video signal comprises a composite video synch pulse from said video systems controller and a video image signal from said camera unit.

34. The system according to claim 33, wherein said video system controller further comprises:

a timing control for generating a timing signal;

a synchronization pulse inserter for receiving the timing signal of said timing control and outputting the composite video synchronization pulse in response thereto for insertion onto said video camera line during the composite synchronization signal time period of the composite video signal.

35. The system according to claim 33, wherein the camera unit further comprises:

a video synchronization separator for reading the composite video synchronization pulse on said video camera line and for outputting the composite video synchronization pulse therefrom;

a camera for receiving the composite video synchronization pulse from said video synchronization separator and for generating a camera video image signal timed to the composite video synchronization pulse; and wherein said camera unit inserts the camera video image signal of said camera onto said video camera line during the composite active video time period of the composite video signal as the composite video image signal.

36. The system according to claim 33, further including said video camera line being a loop having a first end and a second end, said video system controller for inserting the composite video synchronization pulse onto said video camera line at the first end of said video camera line, and said camera unit for inserting the composite video image signal onto said video camera line between the first end and the second end of said video camera line, and the second end of said video camera line for receiving the composite video signal.

37. The system according to claim 33, wherein said video system controller inserts the composite video synchronization pulse on said video camera line such that the composite video synchronization pulse is synchronized with an alternating current input power supply.

38. A system for generating a composite video signal having a composite video synchronization pulse in a composite synchronization signal time period and a composite video image signal in a composite active video time period, said system comprising:

a video camera line;

a video system controller for inserting onto said video camera line the composite video synchronization pulse during the composite synchronization signal time period of the composite video signal and for inserting one of a plurality of camera codes onto said video camera line;

a plurality of camera units, each one of said plurality of camera units associated with a different one of the plurality of camera codes of said video system controller, each one of said plurality of camera units for receiving the composite video synchronization pulse and the camera code on said video camera line, for generating a camera video image signal timed to the composite video synchronization pulse, and for inserting the camera video image signal onto said video camera line during the composite active video time period of the composite video signal as the composite video image signal in response to receiving the one of the plurality of camera codes on said video camera line which is associated with the particular one of said plurality of camera units and wherein each one of said plurality of camera units is constructed so that no composite synchronization pulse is created by said camera unit; and whereby said composite video signal comprises a composite video synchronization pulse from said video systems controller and a video image signal from at least one of said camera units.

39. The system according to claim 38, wherein said video system controller further comprises:

a timing control for generating a timing signal and the one of the plurality of camera codes;

a synchronization pulse and camera code inserter for receiving the timing signal of said timing control and outputting the composite video synchronization pulse in response thereto for insertion onto said video camera line during the composite video synchronization signal time period of the composite video signal, and for receiving the one of the plurality of camera codes from said timing control and outputting the one of the plurality of camera codes in response thereto for insertion onto said video camera line.

40. The system according to claim 38, wherein at least one of said plurality of camera units further comprises:

a video synchronization separator for reading the composite video synchronization pulse on said video camera line and for outputting the composite video synchronization pulse therefrom;

a camera for receiving the composite video synchronization pulse from said video synchronization separator and for generating a camera video image signal timed to the composite video synchronization pulse;

a camera code decoder for reading the camera code on said video camera line and for generating an enable signal upon sensing the one of said plurality of camera codes which is associated with the particular camera unit; and an enable switch for receiving the camera video image signal of said camera and the enable signal of said camera code decoder and for outputting the camera video image signal upon receiving the enable signal for insertion onto said video camera line during the composite active video time period of the composite video signal as the composite video image signal.

41. The system according to claim 38, further including said video camera line being a loop having a first end and a second end, said video system controller for inserting the composite video synchronization pulse onto said video camera line at the first end of said video camera line, and said camera unit for inserting the composite video image signal onto said video camera line between the first end and the second end of said video camera line, and the second end of said video camera line for receiving the composite video signal.

42. The system according to claim 38, wherein said video system controller inserts the composite video synchronization pulse on said video camera line such that the composite video synchronization pulse is synchronized with an alternating current input power supply.

43. A system for generating a composite video signal having a composite video synchronization pulse and a composite video image signal, said system comprising:
   a video camera line;
   a video system controller for inserting the composite video synchronization pulse in a current form onto said video camera line;
   a camera unit for receiving the composite video synchronization pulse on said video camera line, for generating a camera video image signal timed to the composite video synchronization pulse, and for inserting the camera video image signal in a current form onto said video camera line as the composite video image signal and wherein said camera unit is constructed so that no composite synchronization pulse is created by said camera unit; and
   whereby said composite video signal comprises a composite video synch pulse from said video systems controller and a video image signal from said camera unit.

44. The system according to claim 43, wherein said video system controller further comprises:
   a timing control for generating a timing signal;
   a synchronization pulse inserter for receiving the timing signal of said timing control and inserting the composite video synchronization pulse in response thereto for insertion in the current form onto said video camera line.

45. The system according to claim 43, wherein the camera unit further comprises:
   a video synchronization separator for reading the composite video synchronization pulse on said video camera line and for outputting the composite video synchronization pulse therefrom;
   a camera for receiving the composite video synchronization pulse from said video synchronization separator and for generating a camera video image signal timed to the composite video synchronization pulse; and
   wherein said camera unit inserts the camera video image signal of said camera in the current form onto said video camera line as the composite video image signal.

46. The system according to claim 43, wherein said video system controller inserts the composite video synchronization pulse on said video camera line such that the composite video synchronization pulse is synchronized with an alternating current input power supply.

47. The system according to claim 43, wherein said video system controller includes a current driver that converts the composite video synchronization pulse into the current form for insertion onto said video camera line and wherein said camera unit includes a current driver that converts the composite video image signal into the current form for insertion onto said video camera line.

48. The system according to claim 43, wherein said video system controller includes a buffer coupled to said video camera line for receiving the composite video signal on said video camera line and for converting the composite video signal from a current form to a standard form.

49. The system according to claim 43, further including said video camera line being a loop having a first end and a second end, said video system controller for inserting the composite video synchronization pulse onto said video camera line at the first end of said video camera line, and said camera unit for inserting the composite video image signal onto said video camera line between the first end and the second end of said video camera line, and the second end of said video camera line for receiving the composite video signal.

50. The system according to claim 49, wherein said video system controller includes a current driver that converts the composite video synchronization pulse into the current form for insertion onto said video camera line and wherein said camera unit includes a current driver that converts the composite video image signal into the current form for insertion onto said video camera line.

51. The system according to claim 49, wherein said video system controller includes a buffer coupled to the second end of said video camera line for receiving the composite video signal on said video camera line and for converting the composite video signal from a current form to a standard form.

52. A system for generating a composite video signal having a composite video synchronization pulse and a composite video image signal, said system comprising:
   a video camera line;
   a video system controller for inserting the composite video synchronization pulse onto said video camera line in a current form and for inserting one of a plurality of camera codes onto said video camera line;
   a plurality of camera units coupled to said video camera line, each one of said plurality of camera units associated with a different one of said plurality of camera codes, each one of said plurality of camera units for receiving the composite video synchronization pulse and the camera code on said video camera line, for generating a camera video image signal timed to the composite video synchronization pulse, and for inserting the camera video image signal onto the video camera line as the composite video image signal in response to receiving the one of the plurality of camera codes on said video camera line which is associated with the particular one of the plurality of camera unit and wherein each one of said plurality of camera units is constructed so that no composite synchronization pulse is created by said camera unit; and
   whereby said composite video signal comprises a composite video synch pulse from said video systems controller and a video image signal from at least one of said camera units.

53. The system according to claim 52, wherein said video system controller further comprises:
   a timing control for generating a timing signal and the one of the plurality of camera codes;
   a synchronization pulse and camera code inserter for receiving the timing signal of said timing control and outputting the composite video synchronization pulse in response thereto for insertion in the current mode onto said video camera line, and for receiving the one of the plurality of camera codes of said timing control and outputting the one of the plurality of camera codes in response thereto for insertion in the current mode onto said video camera line.

54. The system according to claim 52, wherein at least one of said plurality of camera units further comprises:
- a video synchronization separator for reading the composite video synchronization pulse on said video camera line and for outputting the composite video synchronization pulse therefrom;
- a camera for receiving the composite video synchronization pulse from said video synchronization separator and for generating a camera video image signal timed to the composite video synchronization pulse;
- a camera code decoder for reading the camera code on said video camera line and for generating an enable signal upon sensing the one of said plurality of camera codes which is associated with the particular camera unit; and
- an enable switch for receiving the camera video image signal of said camera and the enable signal of said camera code decoder and for outputting the camera video image signal upon receiving the enable signal for insertion onto said video camera line in the current form as the composite video image signal.

55. The system according to claim 52, wherein said video system controller inserts the composite video synchronization pulse on said video camera line such that the composite video synchronization pulse is synchronized with an alternating current input power supply.

56. The system according to claim 52, wherein said video system controller includes a current driver that converts the composite video synchronization pulse into the current form for insertion onto said video camera line and wherein said camera unit includes a current driver that converts the composite video image signal into the current form for insertion onto said video camera line.

57. The system according to claim 52, wherein said video system controller includes a buffer coupled to said video camera line for receiving the composite video signal on said video camera line and for converting the composite video signal from a current form to a standard form.

58. The system according to claim 52, further including said video camera line being a loop having a first end and a second end, said video system controller for inserting the composite video synchronization pulse onto said video camera line at the first end of said video camera line, and said camera unit for inserting the composite video image signal onto said video camera line between the first end and the second end of said video camera line, and the second end of said video camera line for receiving the composite video signal.

59. The system according to claim 58, wherein said video system controller includes a current driver that converts the composite video synchronization pulse into the current form for insertion onto said video camera line and wherein said camera unit includes a current driver that converts the composite video image signal into the current form for insertion onto said video camera line.

60. The system according to claim 58, wherein said video system controller includes a buffer coupled to the second end of said video camera line for receiving the composite video signal on said video camera line and for converting the composite video signal from a current form to a standard form.

* * * * *